United States Patent [19]

Nichols et al.

[11] Patent Number: 4,767,172
[45] Date of Patent: Aug. 30, 1988

[54] COLLECTOR FOR AN LED ARRAY

[75] Inventors: Virginia R. Nichols, Spencerport; Fred F. Hubble, III, Rochester; James P. Martin, Dansville, all of N.Y.

[73] Assignee: Xerox Corporation, Stamford, Conn.

[21] Appl. No.: 709,973

[22] Filed: Mar. 11, 1985

Related U.S. Application Data

[63] Continuation of Ser. No. 461,779, Jan. 28, 1983, abandoned.

[51] Int. Cl.$^4$ .......................... G02B 6/32; G03B 27/00
[52] U.S. Cl. ...................................... 350/96.18; 355/1
[58] Field of Search .......................... 355/1, 3 R, 67; 350/96.18, 443, 444; 362/800

[56] References Cited

U.S. PATENT DOCUMENTS

| | | | |
|---|---|---|---|
| 1,977,689 | 10/1934 | Muller | 350/443 X |
| 2,215,900 | 9/1940 | Bitner | 350/443 X |
| 2,683,394 | 7/1954 | Polanyi et al. | 350/443 |
| 3,330,190 | 7/1967 | Taillie | 350/96.18 X |
| 4,255,042 | 3/1981 | Armitage et al. | 355/3 R |
| 4,257,672 | 3/1981 | Balliet | 350/96.17 |

Primary Examiner—Fred L. Braun
Attorney, Agent, or Firm—Ronald F. Chapuran

[57] ABSTRACT

A light collector for an LED array for efficiently collecting and collimating light emitting from the LEDs and projecting the light into an optical wave guide which directs that light onto a photoreceptor surface. Each LED is centered in a hemispherical cavity in the collector array in order that radiation from the LED enters the collector essentially unrefracted. The collector array provides a convex lens portion and a parabolic reflecting surface portion. Light that exits from the LED that is substantially perpendicular to the substrate supporting the LED is applied to the convex lens and is collimated. Light exiting substantially parallel to the substrate strikes a parabolic reflecting surface at greater than the critical angle and is also collimated. The two concentric collimated beams are combined and applied to the photoreceptor surface via a light pipe or optical wave guide secured to the collector.

3 Claims, 6 Drawing Sheets

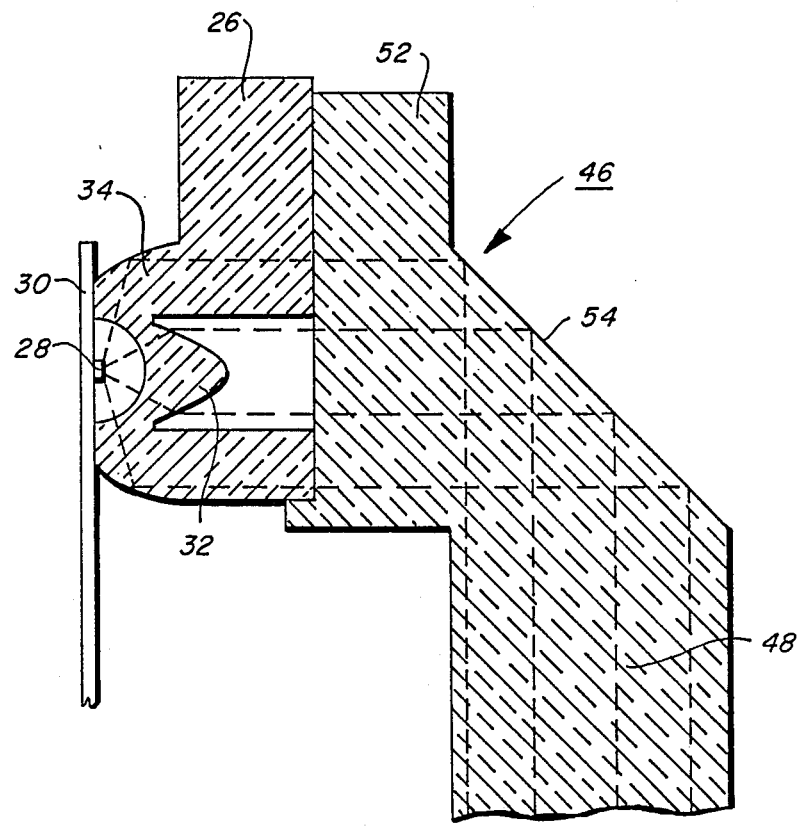

COLLECTOR FOR AN LED ARRAY

This is a continuation, of application Ser. No. 461,779, filed Jan. 28, 1983, now abandoned.

The present invention relates to a light collector for an LED array, in particular a light collector for an array used in an electrophotographic machine for patch generation on a photoreceptor surface and for pitch and edge erasure on the surface.

Light emitting diodes (LEDs) are low cost, reliable light sources that emit light patterns that are generally broad. The broad light patterns of LEDs often impede the efficient of the LEDs with light pipes, optical wave guides or other optical transmission media.

It is known to optically couple an LED to a light pipe by abutting the end of the light pipe against the LED. Since the LED source is small, however, proper alignment is difficult. Furthermore, when the acceptance angle of the light pipe is small, coupling is inefficient.

Lenses and reflectors have been used to focus and collimate a wide emission LED. However, with the use of lenses and reflectors alignment is often difficult and therefore expensive. For example, as disclosed in U.S. Pat. No. 4,257,672, a spherical lens structure is used as an optical coupler for coupling a relatively wide emission light source to an optical transmission line. In particular, the wide emission light source is mounted adjacent the center of one end of a cylinder. The spherical lens structure is mounted on the opposite end of the cylinder at a predetermined distance from the light source and in an orientation to maximize the amount of light entering the optical transmission line. A difficulty with this type of construciton, particularly in using an array of LEDs, is the need to align each discrete LED with a spherical structure. In addition, only light striking the spherical surface is captured in the light pipe. It would be desirable, therefore, to provide a relatively inexpensive, reliable and simple means to optimize the collection of light from an array of LEDs at one end of a light pipe.

Other prior art references such as U.S. Pat. No. 4,255,042, teach the use of an LED array as an erase lamp to discharge portions of a photoconductive surface. Conventionally, in electrophotographic machines, erase lamps have been incandescent or fluorescent lamps in which the lamp illumination has been attenuated by shields to the photoconductor to obtain sharp edge delineation of the erased charge on the photoconductor. Generally, since LEDs produce a relatively small quantity of light as compared to other types of lamps, LEDs have generally been used with optical wave guides to transmit a sufficient amount of light to the photoconductor. It is taught in U.S. Pat. No. 4,255,042 to provide a light channel having one end next to an array of discrete light emitting diodes for channeling the light to a photoconductive surface located at the opposite end of the channel. Light is emitted from the LEDs into the light pipes and internally reflected and propagated down the light pipes to the photoconductor.

A difficulty with prior art systems using LED arrays is that there is generally a loss of edge light that is not captured by the light pipes with the resultant inefficient light transmission. Another difficulty arises from imperfect or uncollimated light entering the wave guide resulting in light exiting the wave guide in an uncontrolled fashion and discharging portions of the image. In addition, it is relatively complex and expensive to mount and package a large array of discrete LEDs. It would be desirable, therefore, to provide an efficient and simple means to collect and propagate light in a well controlled manner from an array of LEDs to a photoconductive surface.

It is, therefore, an object of the present invention to provide a new and improved light collector for an LED array. It is another object of the present invention to provide a light collector for an LED array for use in discharging selected portions of a photoconductive surface.

It is still another object of the present invention to provide a light collector for an LED light source that forms a hemispherical cavity about an LED and provides both a convex lens and a parabolic reflecting surface for collecting and directing light emitted from the LED.

It is another object of the present invention to provide a means to collect radiation emitted from the sides of an LED into a collimated beam of light.

Further objects and advantages of the present invention will become apparent as the following description proceeds and the features of novelty characterizing the invention will be pointed out with particularity in the claims annexed to and forming a part of this specification.

Briefly, the present invention is a light collector for an LED array for efficiently collecting and collimating light emitting from the LEDs and projecting the light into an optical wave guide which directs that light onto a photoreceptor surface. Each LED is centered in a hemispherical cavity in the collector array in order that radiation from the LED enters the collector essentially unrefracted. The collector array provides a convex lens portion and a parabolic reflecting surface portion. Light that exits from the LED that is substantially perpendicular to the substrate supporting the LED is applied to the convex lens and is collimated. Light exiting substantially parallel to the substrate strikes a parabolic reflecting surface at greater than the critical angle and is also collimated. The two concentric collimated beams are combined and applied to the photoreceptor surface via a light pipe or optical wave guide secured to the collector.

Other objects and advantages of the present invention will become apparent upon reading the following detailed description and upon reference to the drawings in which:

FIG. 4 is a sectional view of the relationship of an LED, the light collector, and the light pipe in accordance with the present invention;

Figure 1:
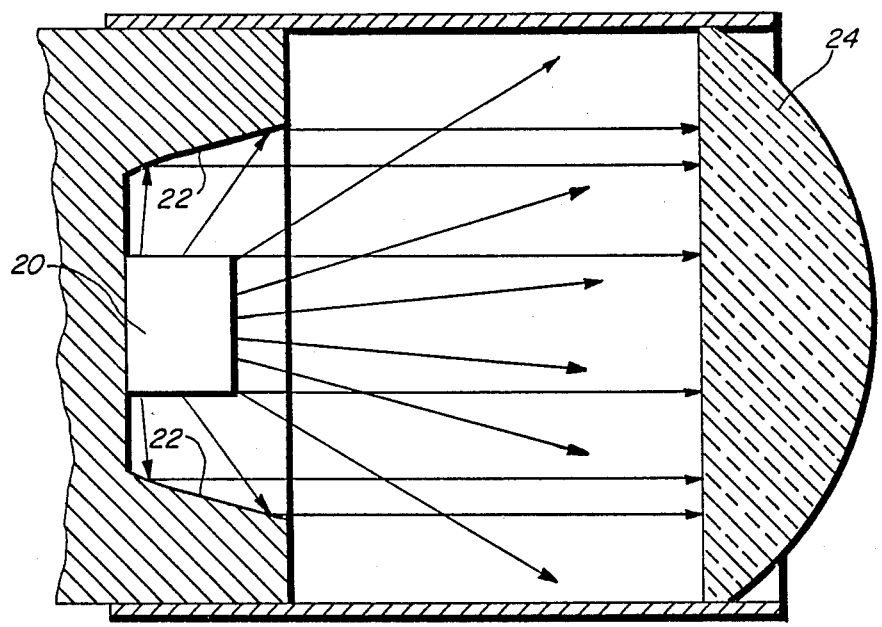
FIG. 1 is a typical prior art configuration of the means to capture the light rays emitting from an LED.

With reference to FIG. 1, there is shown a typical prior art device for increasing the light output efficiency of a light emitting diode (LED). A light emitting diode 20 is positioned at the focal point of a suitably coated reflector 22. The light rays emitted from the sides of the LED are relected from the reflector 22 into a generally collimated light beam. However, the light rays emitted from the front of the LED, as illustrated by the arrows, do not strike the reflector and are therefore scattered and lost. To compensate for those light rays that are not reflected, it is known to place a suitable lens 24 in front of the LED to collect the unreflected rays and produce a collimated beam. Unfortunately, while the lens 24 may collimate the scattered light rays, it tends to disperse those light rays already collimated by the reflector 22.

Figure 2:
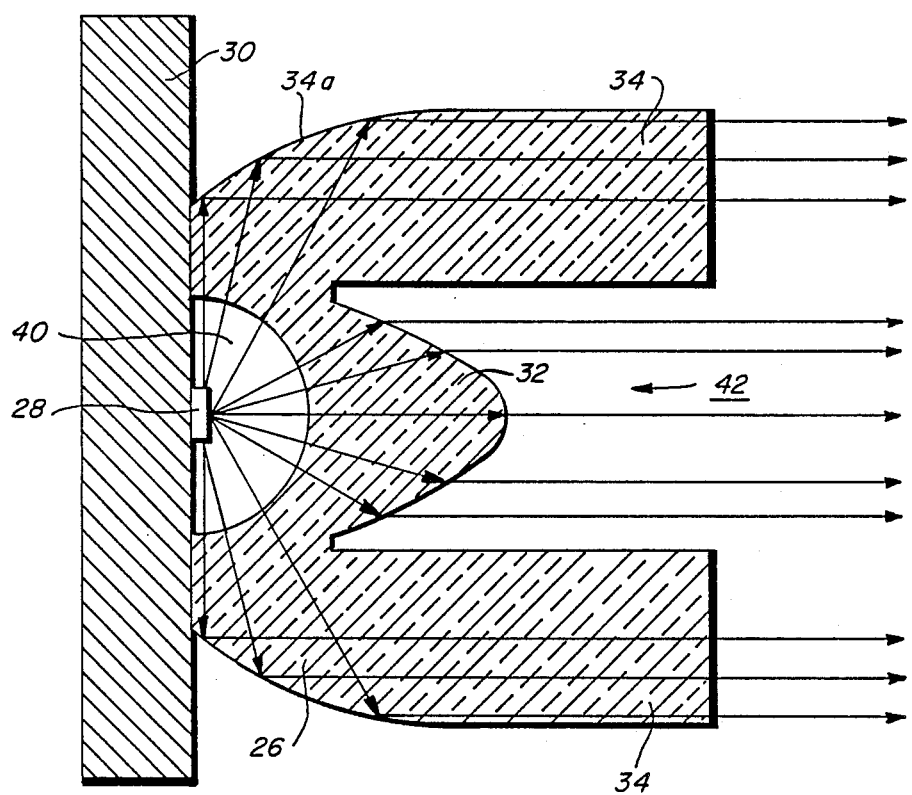
FIG. 2 is a profile of a light collector in accordance with the present invention.

In accordance with the present invention, there is provided an integrally molded light collector, generally shown as 26, for collecting and collimating the light rays projected from an LED as shown in FIG. 2. In particular, an LED 28 is suitably mounted on a substrate 30. The integral collector 26 is preferably any appropriate transparent plastic material such as styrene, acrylic or polycarbonate. The collector is comprised of a convex center lens portion 32 with a concentric surrounding leg portion 34 appending therefrom. An edge portion of the leg 34 is rigidly secured to the substrate 30 concentric with the LED 28. Preferably, substrate 30 is a porcelain coated metal or ceramic material. A semicircular air pocket 40 separates the LED 28 from the collector 26. The cavity around the LED provides mechanical protection and insulation from dirt and other foreign particles that might diminish light output. It should be noted the cavity or air pocket 40 could be filled with any suitable optical transparent filler in order to increase the output of the LED through index of refraction matching. Another air pocket 42 is formed between the leg 34 and the lens 32.

In operation, light rays projected from the sides of the LED 28 traverse the air pocket 40, enter the end portion of the leg 34 and are reflected from the parabolic outside surface 34a of the leg 34 and form generally parallel light paths or collimated beams of light through the leg 34. Light rays projected from the top of the LED 28 traverse the air pocket 40 and enter portion 32. The convex surface lens 32, as illustrated, refracts the light beams into a collimated beam into and through the air pocket 42.

Figure 3:
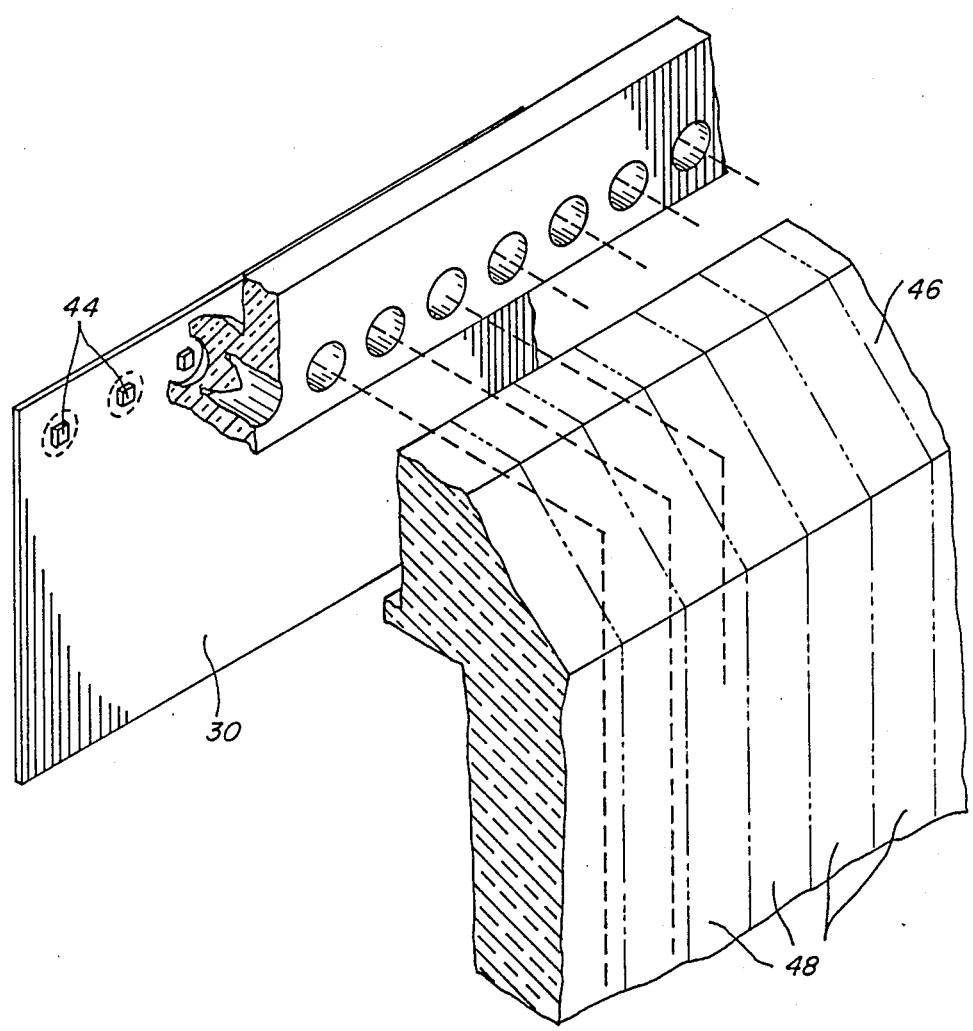
FIG. 3 is an isometric drawing illustrating the LED array and segmented light pipes.

In a preferred embodiment, an array of LEDs is used in a strip to selectively dissipate the charge on a photoreceptor. With reference to Figure 3, there is shown a substrate 30 supporting a plurality of LEDs 44 aligned with an optical wave guide 46 comprising a plurality of light pipes 48. The optical wave guide 46 is rigidly secured to the substrate 30, in order that one end of each of the segmented light pipes 48 is securely fastened in alignment with one or more of the LEDs 44. Light pipes of various widths could be provided in alignment with one or more LEDs to perform designated functions. For example, light pipes could be used for edge fadeout, pitch erase, and patch generators in an electrophotographic machine.

With reference to FIG. 4, there is shown in more detail the alignment of the optical wave guide with the substrate supporting the LEDs. In particular, an LED 28 is shown mounted on substrate 30. Also secured to the substrate 30 is the collector 26 connected to the optical wave guide 46. It should be understood that the collector 26 is an integral unit comprised of several subassemblies having a lens portion 32 and a leg portion 34, although only one assembly is illustrated in FIG. 4.

Figure 6:
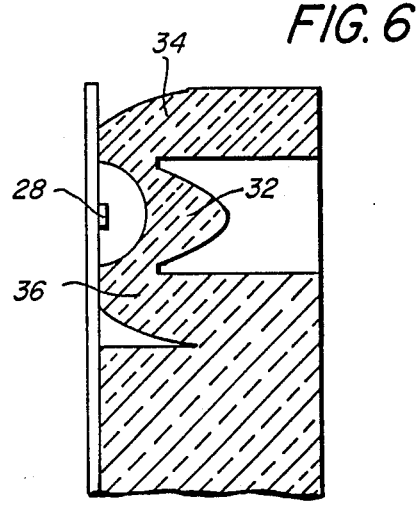
FIGS. 5, 6 and 7 are a top view, end view cross section and side view cross section of the LED array and light collector in accordance with the present invention.
Figure 5:
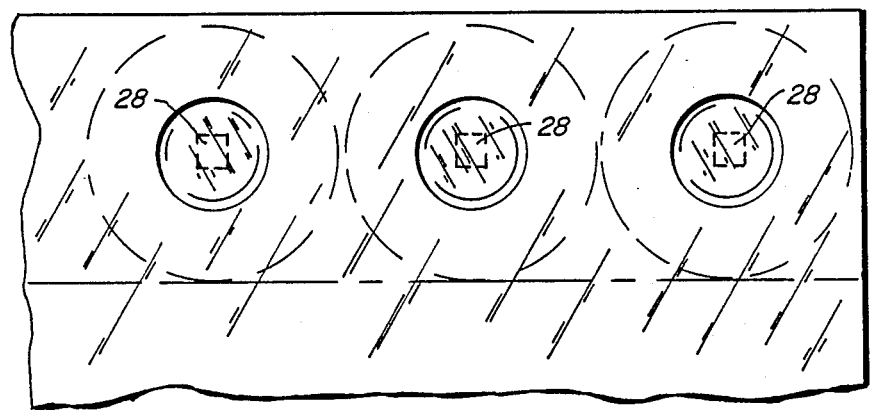
Figure 7:
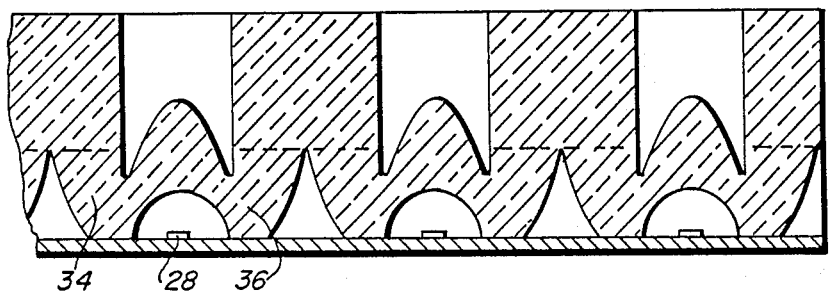

The optical wave guide 46 includes a connector portion 52, a reflector surface 54 and a light pipe portion 48 terminating adjacent to a photoreceptor surface. The light rays projecting from the LED 28 are reflected through the leg portion 34 or refracted through the lens surface 32 into well collimated, concentric beams of light that are reflected from the surface 54 into the light pipe 48. It should be noted that the light rays projected from the LED either from the side or from the top of the LED are reflected by either the legs or refracted by the lens 32 into two collimated beams. Since the two beams are well collimated, reflection from surface 54 can be by total internal reflection, thus avoiding the need to coat surface 54 with a reflective material. FIGS. 5, 6 and 7 show in more detail a top view, an end view cross section and a side view cross section of an LED collector array.

Figure 8:
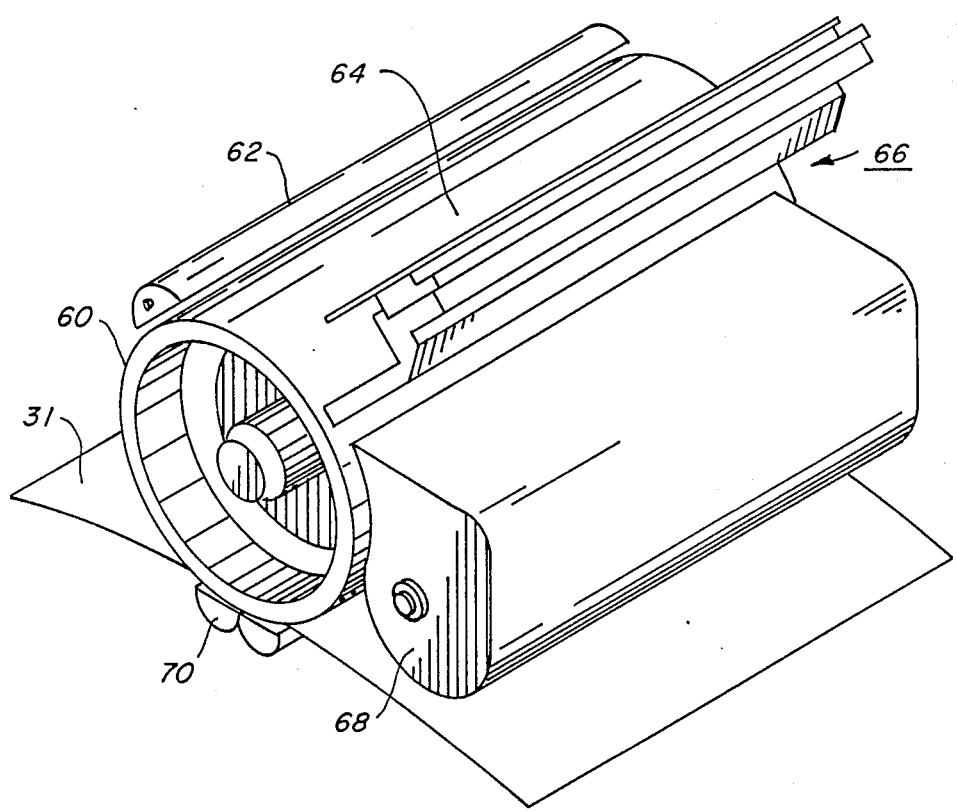
FIG. 8 is an illustration of the LED array and light collector in relation to a photoreceptor surface.

In operation, there is shown in FIG. 8 a photoconductor 60 in an electrophotographic process. The photoconductor 60 is illustrated as rotating in a clockwise direction to receive first a uniform charge under a charging device 62. Upon receiving an image at station 64, the photoreceptor continues to rotate to the LED array and segmented light pipes illustrated at 66. By selective activation of LEDs, the light pipes can be used to discharge edge portions or pitch portions on the photoreceptor surface or to provide a test patch for system correction. Next, the photoreceptor advances to the development station illustrated at 68 at which toner is placed on the image and on the test patch if present, and then to the transfer station 70 at which the image is transferred to a copy sheet. Not shown are the usual steps of fusing of the image to the copy sheet and the placement of the copy sheet in an output tray.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. A molded light collector for collimating the light rays emitting from a relatively wide emission light source for coupling to an optical wave guide, the light source being an LED mounted on a substrate, the light collector enclosing the LED and forming a hemispherical cavity around the LED, a portion of the light collector being integrally secured to the substrate, the light collector comprising an optical wave guide, a lens portion for collimating the light exiting from the light source substantially perpendicular to the substrate, and a reflecting portion attached to the substrate for collimating the light exiting from the light source substantially parallel to the substrate, the hemispherical cavity forming an air pocket between the LED and the light collector wherein the collimated light beams are combined and applied to the optical wave guide.

2. The light collector of claim 1 in which the lens portion is a convex lens collimating the light exiting from the light source within an approximately 40° cone relative to a perpendicular to the substrate.

3. The light collector of claim 1 wherein the reflecting portion is a parabolic reflector for collimating the light rays emanating from the light source at an angle from 45° to 90° relative to a perpendicular to the substrate.

* * * * *